United States Patent [19]
Schlüter et al.

[11] Patent Number: 5,294,853
[45] Date of Patent: Mar. 15, 1994

[54] ELECTRICAL POWERPLANT FOR VEHICLES

[75] Inventors: Gerd Schlüter, Joachimstaler Weg 13, 2300 Kiel 14; Gerd Knippschild, Helsinkistr. 1, 2300 Keil 1; Hans-Jürgen Lipski, Bahrenfelder Marktplatz 4, 2000 Hamburg 50, all of Fed. Rep. of Germany

[73] Assignees: Norman Schlomka; Gerd Schlüter; Gerd Knippschild, all of Kiel; Hans-Jürgen Lipski, Hamburg, all of Fed. Rep. of Germany

[21] Appl. No.: 896,001

[22] Filed: Jun. 10, 1992

[51] Int. Cl.⁵ .................. H02K 11/00; H02P 1/00
[52] U.S. Cl. .................. 310/68 R; 310/156; 318/138
[58] Field of Search ........... 310/40 MM, 67 R, 68 D, 310/68 R, 156, 261, 268; 318/138, 139, 722, 723; 307/10.1

[56] References Cited

U.S. PATENT DOCUMENTS

| | | | |
|---|---|---|---|
| 4,223,255 | 9/1980 | Goldman et al. | 318/138 |
| 4,316,132 | 2/1982 | Geppert | 318/723 |
| 4,491,768 | 1/1985 | Slicker | 318/139 |
| 4,556,828 | 12/1985 | Thompson | 318/254 |
| 4,585,085 | 4/1986 | Handel et al. | 310/68 R |
| 5,079,461 | 1/1992 | Schluter et al. | 310/68 D |

FOREIGN PATENT DOCUMENTS

| | | | |
|---|---|---|---|
| 0046997 | of 1981 | European Pat. Off. | 318/138 |
| 2010594 | of 1970 | Fed. Rep. of Germany | 318/138 |
| 2645507 | of 1976 | Fed. Rep. of Germany | 318/138 |
| 3410293 | of 1984 | Fed. Rep. of Germany | 318/138 |
| 62-135251 | of 1985 | Japan | 318/138 |

OTHER PUBLICATIONS

Rechnerische Behandlung, Betriebsverhalten und Ersatzschaltbild des asynchronen Schiebenmotors, 1973, pp. 574–577, Von Hardo May et al.
Zweikraftlokomotive mit Drehstromtechnik, Von Werner Kuhn et al 1978, pp. 135–142.

Primary Examiner—Steven L. Stephan
Assistant Examiner—Matthew Nguyen
Attorney, Agent, or Firm—Walter C. Farley

[57] ABSTRACT

An electric power plant comprising a battery and a DC-three-phase AC inverter, for a vehicle, in particular an automobile. The powerplant comprises at least one three-phase disk-rotor motor (6) assigned to one vehicle wheel, the supply voltage for said motor being adjustable in amplitude and frequency.

5 Claims, 8 Drawing Sheets

ELECTRICAL POWERPLANT FOR VEHICLES

FIELD OF THE INVENTION

The invention concerns an electrical power plant for vehicles.

BACKGROUND OF THE INVENTION

Conventional vehicles for present street and road traffic are powered by internal combustion engines. Electrically powered vehicles also are known, some of which are supplied by batteries and others by solar power equipment. Battery-powered drives have long been used for railway station carts, fork lifts and the like.

The essential drawbacks of electrically powered vehicles are that battery recharging demands substantial time or necessitates expensive exchange of the batteries, battery capacity being significantly limited because of weight and also because the required controls entail additional losses. Also, the batteries, drive motors and controls are heavy, degrading the energy picture.

An electrical wheel-drive for motor vehicles, in particular for hybrid automobiles, is known from the nearest document of the state of the art, namely EP 46 997 A2, which describes a system in which one electronically rpm-controlled, polyphase, brushless electric motor is associated with each wheel. The wheel-hub motors are multi-gap axial field motors of which the rotors replace the wheel drums and brake disks and of which the stators replace the brake pads and splash-guard plates. The stator comprises inwardly projecting support elements carrying pancake annular coils mounted in the air gaps between the pole pieces.

The annular coils consist of scaled, laminated windings with use of ribbon conductors.

The rotor for this wheel drive is mechanically very complex and its weight is high. Accordingly, when the vehicle is decelerated or accelerated, substantial inertia is encountered. Moreover, the drive control circuit is very simple and accordingly it does not make optimal use of available energy.

A disk-rotor motor is known from the periodical etz-A, vol. 94 (1973, 10, pp 547), which may be used as vehicle drive. This disk-rotor motor however is not such in the rigorous sense, because its winding planes are radial to the motor axis, whereas conventional disk-rotor motors make use of plastic boards with copper-laminated conducting strips on one or both sides.

A three phase AC double-power locomotive is known from BBC News, 4, pp 135-140, which comprises a DC-DC converter compensating large voltage differences in the power line. The document discloses an adjustable pulse-width control of which the output voltage is applied to the three-phase AC coil of the motor.

Lastly, German Auslegeschrift 20 10 594 discloses a motor vehicle with three-phase AC drive, a three-phase AC motor being present at two mutually opposite edges of the vehicle and of which the control is affected by the steering of the driver. No provision is made for a three-phase AC disk-rotor motor.

SUMMARY OF THE INVENTION

Based on EP 46 997 A2, it is the object of the invention to create an electrical drive for a vehicle in which the required weights of the drive motors are substantially reduced, which evinces high efficiency and of which the design is simple.

The features of the invention offer the advantage of extremely low weight, as a result of which the moments of inertia are considerably reduced. The electrical circuitry evinces simple design, advantageous control over a large range of applications and high efficiency, especially significant in lowering the vehicle power requirements and hence in raising its applicability.

The invention allows substantially reducing the weights of the drive motors. Moreover, compactness is achieved, and accordingly one motor may be assigned to each drive wheel and mechanical transmissions from the motors to the individual wheels can be largely eliminated. Especially when driving along curves, the torques of the drive wheels may be balanced.

BRIEF DESCRIPTION OF THE DRAWINGS

The invention is elucidated below in relation to illustrative embodiments shown in the drawings wherein.

DESCRIPTION OF THE PREFERRED EMBODIMENTS

Figure 1:
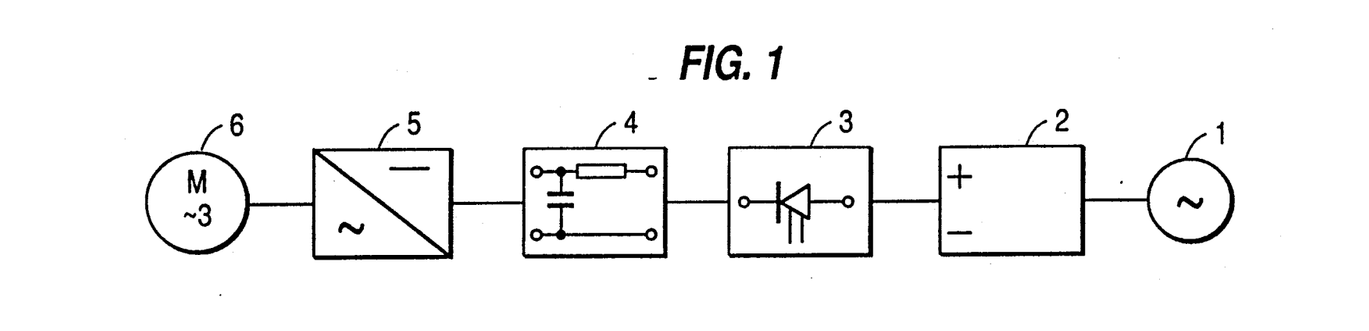
FIG. 1 is a schematic block diagram of a control system.

The functional circuit diagram of FIG. 1 shows a generator 1 connected to charge a vehicle battery 2. Preferably, generator 1 is mounted outside the vehicle and used as needed to recharge the battery. However, generator 1 may be mounted inside the vehicle and can take the form of an internal-combustion engine driving the generator and constantly recharging the battery.

Preferably, a three-phase AC disk-rotor motor is associated with each automobile wheel. As a result, the wheels need not be mechanically interconnected such as by synchro-mesh gears.

Figure 9:
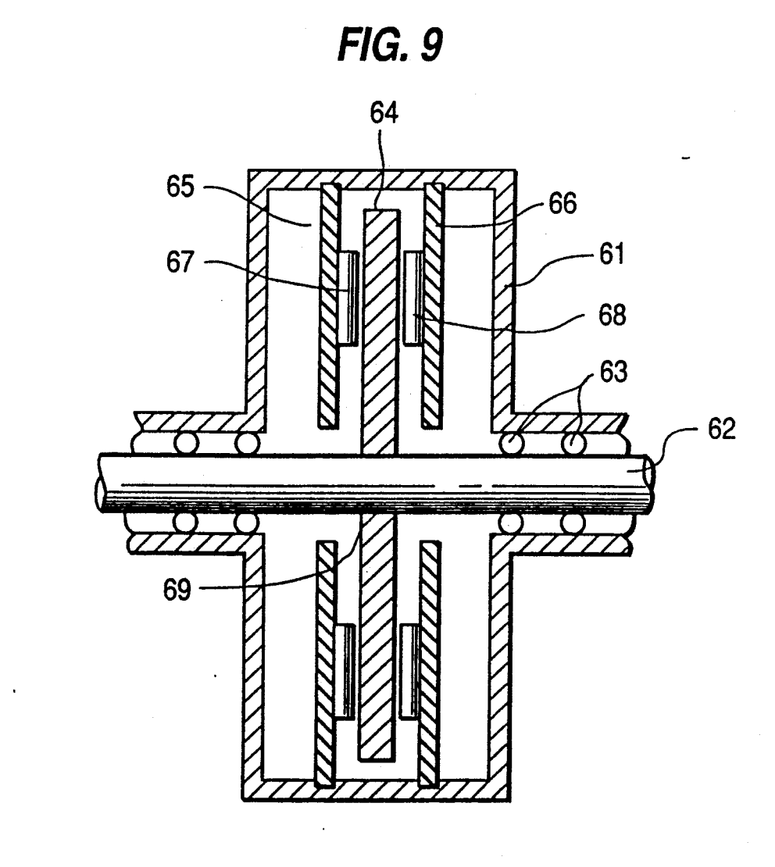
FIG. 9 is a side elevation, in section, of a simplified disk-rotor motor usable in the system of the present invention.
Figure 10:
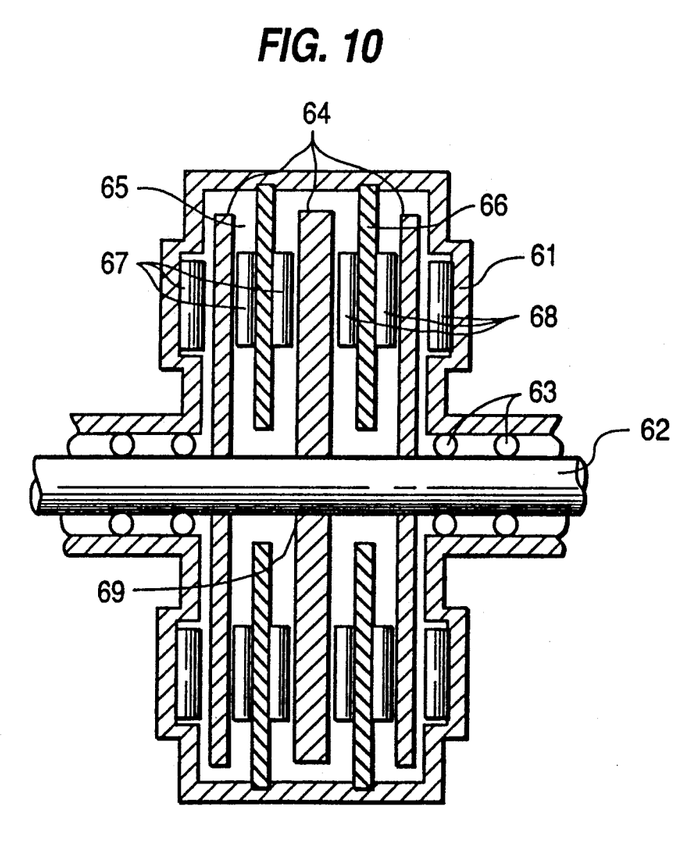
FIG. 10 is a side elevation, in section, of a further embodiment of a simplified disk-rotor motor usable in the system of the present invention.

Illustratively, a three-phase AC disk-rotor motor is similar to that shown in FIG. 9 or 10 and includes one or more plastic boards 64 coated on both sides with conducting strips arrayed in a specific manner, only one board being shown in FIG. 9. The board is directly affixed to the axle 62 at 69. Magnets 67, 68 of alternating polarities are mounted on supports 65 and 66 on both sides of board 64, the supports being carried on a housing 61. These magnets are provided with iron returns running around their supports.

A design of a three-phase AC disk-rotor is disclosed in essential form in U.S. Pat. No. 5,079,461, the unit in this case being a generator. A further embodiment of a motor structure is shown in FIG. 10 in which a plurality of armature disks are mounted on the shaft with sets of magnets between the disks.

Referring again to FIG. 1, motor 6 is equipped with wiper contacts for its power supply, those contacts preferably being located radially inward at the motor shaft. If contactless power supply is desired, the magnets must be mounted on the motor shaft, in which case the boards carrying the windings are stationary. Because the magnets' inertial forces require controlling substantial centrifugal forces, rare-earth magnets preferably are used.

The output voltage of battery 2 is fed to a DC-DC converter 3 wherein the battery DC voltage of, for instance, 24 v is raised to a DC voltage of 380 v. The DC amplitude can be adjusted by the DC-DC converter. The higher direct current generated in the DC-DC converter 3 is smoothed in a subsequent smoothing device 4. A frequency-adjustable DC-AC inverter 5 receives the direct current from smoothing device 4. Inverter 5 produces three-phase AC which is directly fed to the AC winding of the three-phase AC disk-rotor motor 6.

Figure 2:
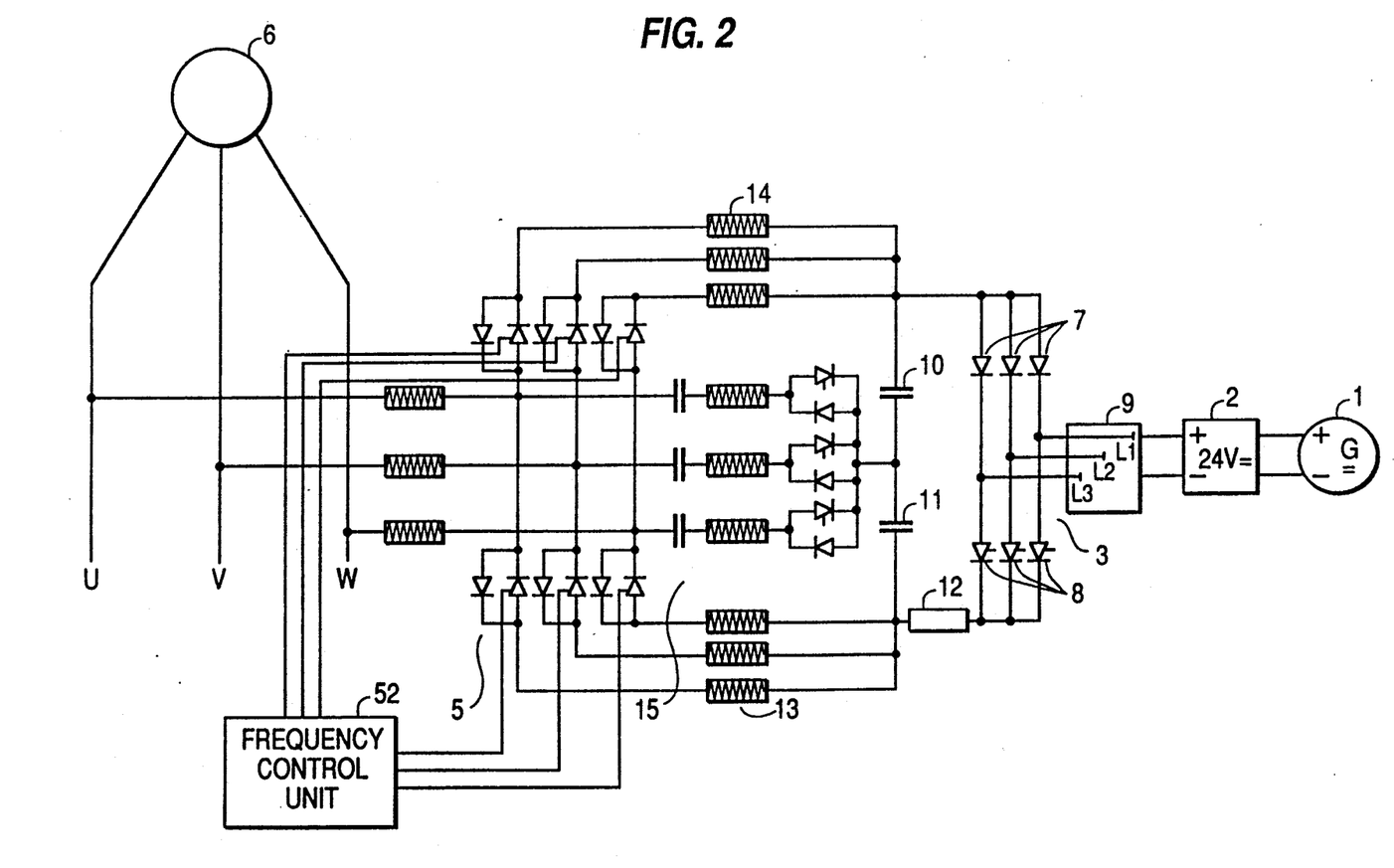
FIG. 2 is a schematic circuit diagram of the control system of FIG. 1.

FIG. 2 shows a functional circuit diagram of the circuit components of FIG. 1. The DC-DC converter 3 contains a controllable DC-AC inverter 9 followed by sets of rectifiers 7 and 8. The subsequent smoothing device includes capacitors 10 and 11, resistor 12, sets of chokes 13 and 14 and a smoothing circuit indicated generally at 15. AC is generated by the subsequent DC-AC inverter 5 which preferably consists of thyristors with antiparallel quenching or commutating diodes. The frequency of the DC-AC inverter 5 is adjustable. The frequency adjustment can be accomplished by a frequency control unit 52 which provides control pulses to the gates of the thyristors. The three-phase AC across the output terminals is fed to the windings U, V and W of motor 6. The motor windings may be Y or Δ.

The AC amplitude can be adjusted by means of the DC-DC converter 3. The AC frequency can be changed by the DC-AC inverter 5. As a result, the rpm of motor 6 and its power drain can be matched to changing requirements.

Figure 3:
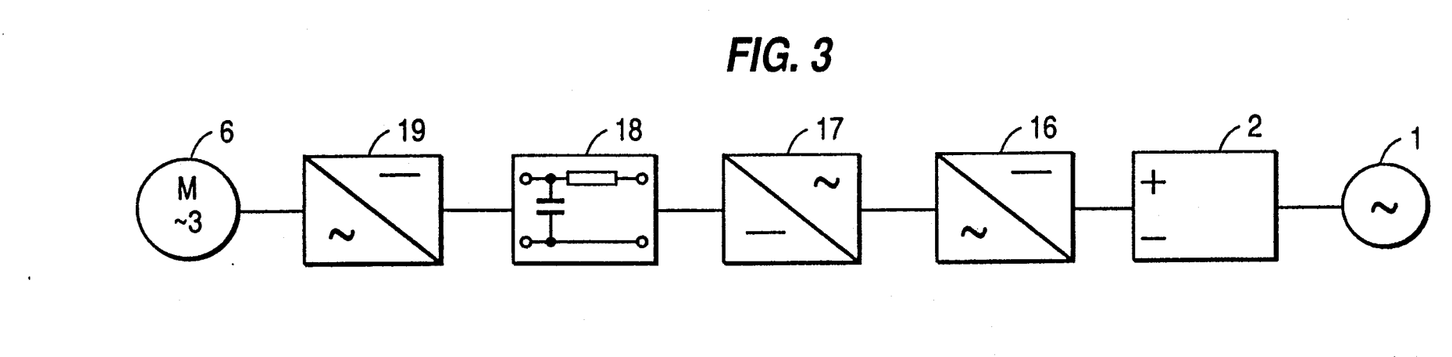
FIG. 3 is a schematic block diagram of a pulse control.

FIG. 3 shows a block diagram of another embodiment of a circuit of the invention. In this case the voltage from battery 2 is fed to a DC-AC inverter 16 which generates, for instance, 380 v three-phase AC. The DC-AC inverter may be controlled or not. The AC output of inverter 16 DC is rectified in rectifier 17 and is smoothed by the smoothing device 18. Next there is a DC-AC inverter 19 of which the frequency is controllable and which generates a three-phase AC that can be applied to the motor 6. The DC-AC inverter 19 preferably has a pulse-width control or a pulse-train control (i.e., pulse repetition rate) or a combination of those. The control of the pulse width allows setting the amplitude of the AC, and the control of the pulse train repetition rate allows simultaneous control of frequency and amplitude.

Figure 4:
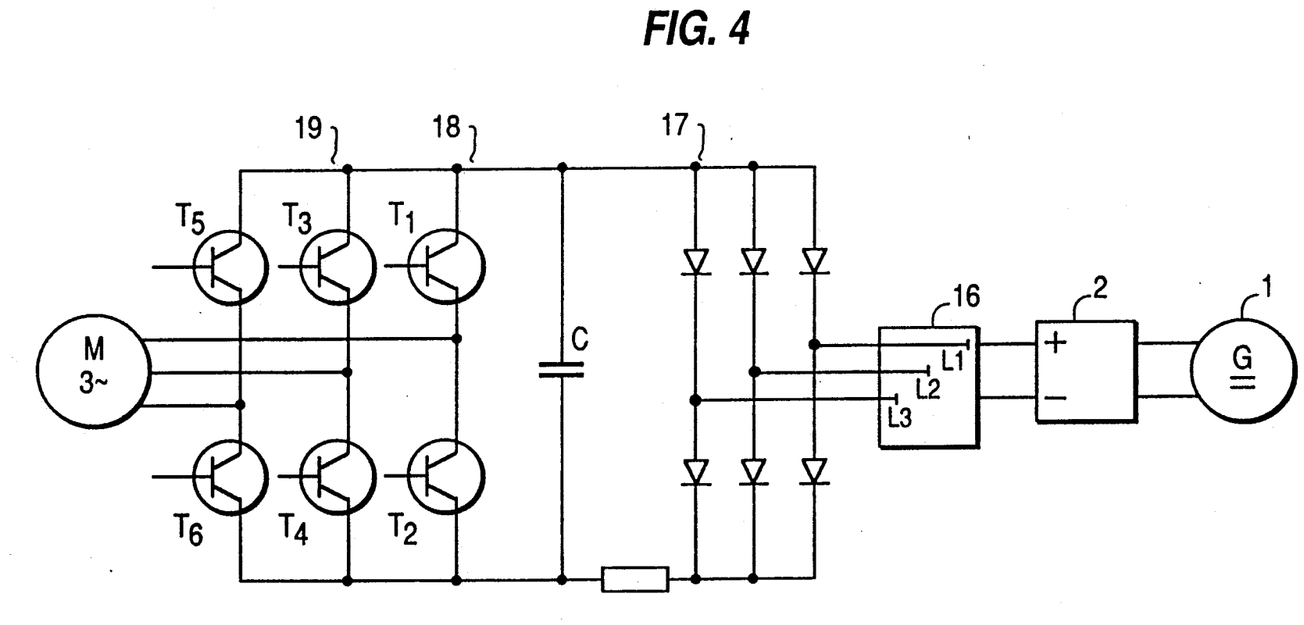
FIG. 4 is a schematic circuit diagram according to FIG. 3.

FIG. 4 shows a portion of a circuit of FIG. 3. This much simplified circuit diagram shows the DC-AC inverter 16 generating AC which is converted by the rectifier 17 into DC. The smoothing device 18 comprising capacitors and coils is followed by the DC-AC inverter 19. This inverter 19 preferably includes transistors or thyristors which are linked by a control circuit in such a way that positive and negative pulse trains can be generated each time which are split over three phases so that an AC is produced which can be fed to the motor 6.

Figure 5A:
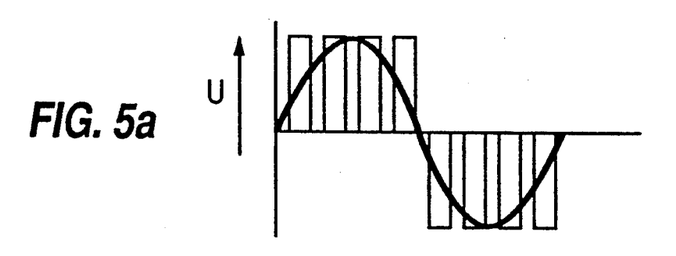
FIGS. 5a and 5b are waveform diagrams showing drive pulses.
Figure 5B:
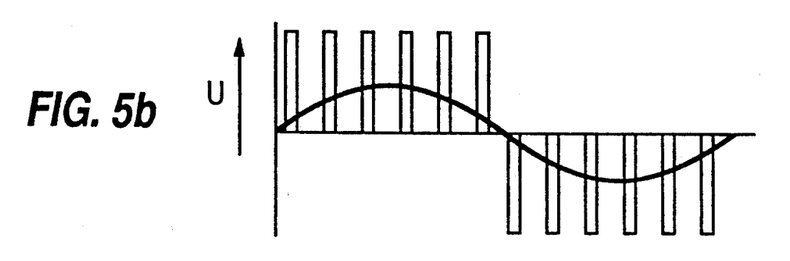

FIG. 5 illustratively shows the generation of three-phase AC by means of a circuit of FIG. 4. FIG. 5a shows a high voltage at large pulse width, and FIG. 5b shows a low voltage of which the amplitude is determined by a narrow pulse width. The frequency of the generated three-phase AC depends on the number and spaces between the pulses during one halfwave.

Illustratively, if a pulse train shown in FIG. 5a is to be generated, then transistors T2 and T3 (FIG. 4) must be jointly controlled to be conducting four times and then be blocking four times. Thereafter the transistors T2 and T3 remain nonconductive and the transistors T4 and T1 are jointly made conducting first and then nonconductive. To feed the other terminals, the transistors are driven with a 120° shift.

Figure 6:
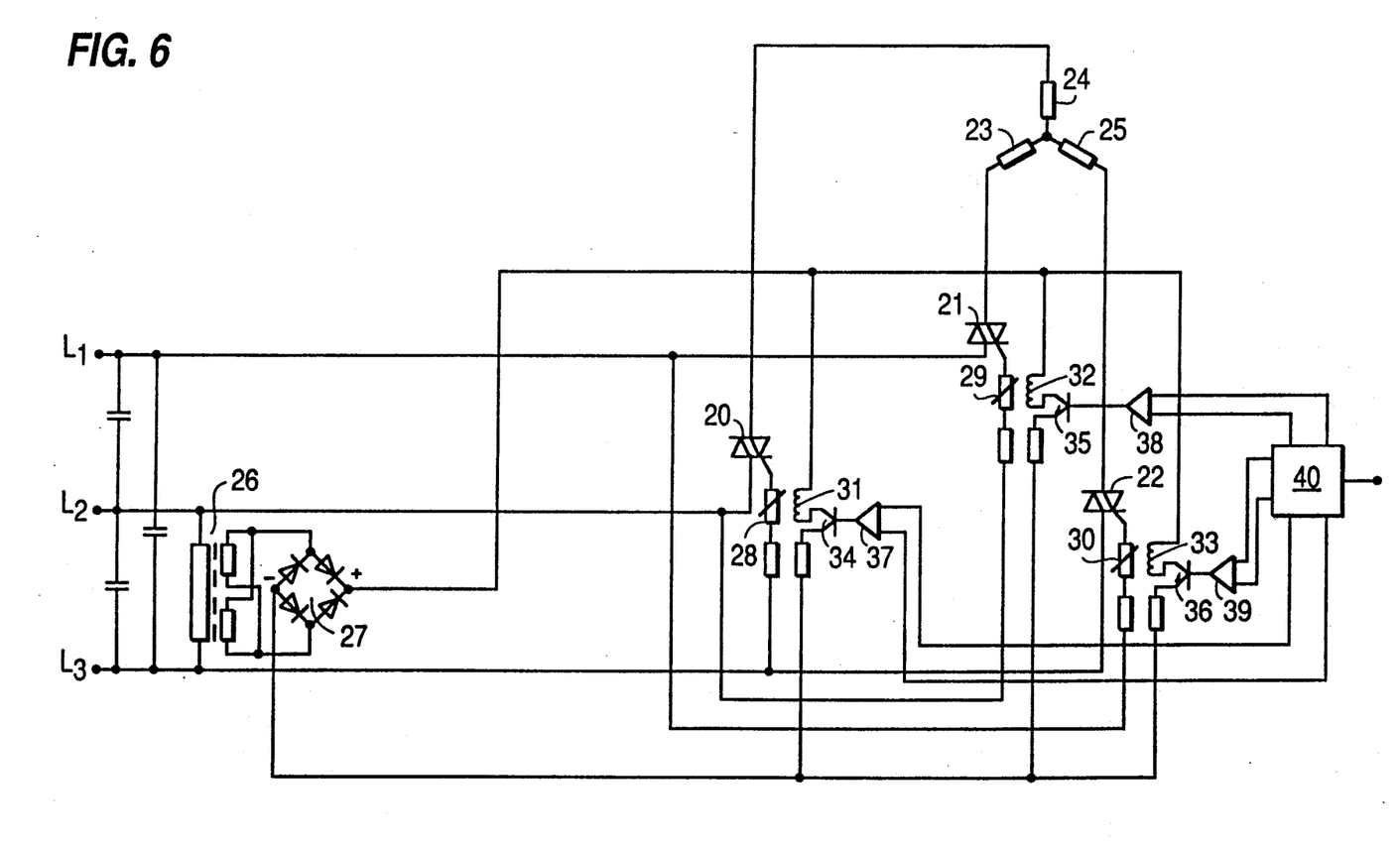
FIG. 6 is a schematic circuit diagram of an alternative motor control circuit.

FIG. 6 shows another way of controlling a three-phase AC disk-rotor motor. AC terminals L1, L2 and L3 are connected through thyristors 20, 21, 22 to the windings 23, 24, 25 to the Y-wired motors. A DC is generated by means of a transformer 26 and a rectifier 27. Magnetically controlled resistors 28, 29, 30 each with a pre-resistor are mounted between the thyristor gates and another phase. The magnetically controlled resistors are driven by associated coils 31, 32, 33 in the collector circuits of transistors 34, 35, 36. The transistors are driven by operational amplifiers 37, 38, 39.

Integrated pulse generators known per se are connected to the operational amplifiers and can be controlled, for instance in frequency, at constant cycle ratio.

By adjusting the frequency and/or the timing of the pulse generators, a further control domain to feed the disk-rotor motor can be mastered. This feature also allows adjusting the torque as a function of the vehicle steering angle.

Figure 11:
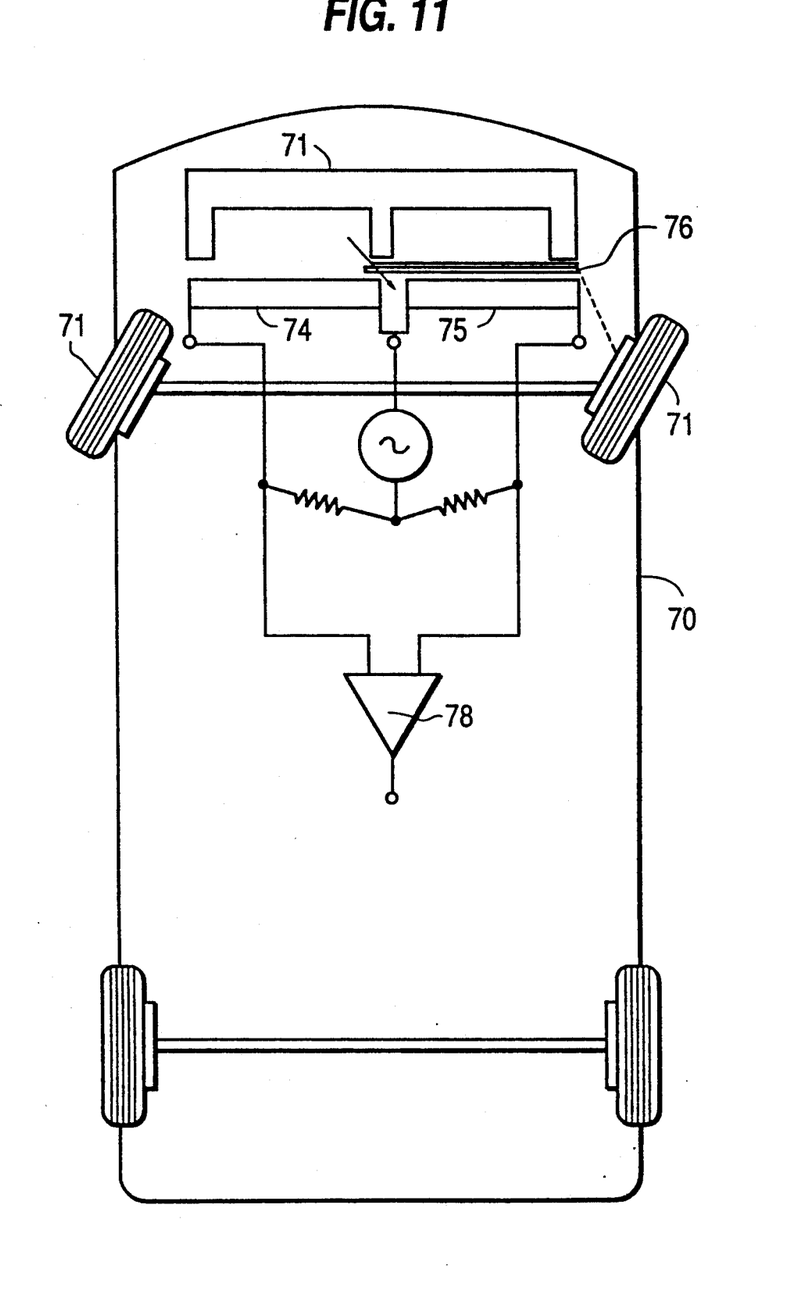
FIG. 11 is a simplified schematic diagram of a steering technique in accordance with the present invention.

A technique for exercising this control is shown schematically in FIG. 11 in which the vehicle 70, shown only in outline, has steerable wheels 71. A control device, shown considerably enlarged relative to the vehicle, includes a permanent magnet 71 having three poles and two coils 74 and 75 which are connected in series. A movable disk 76 is disposed between the magnet and the coils and is mechanically coupled to the steerable wheels. The disk alters the coupling between the magnet and the coils as a function of steering angle. The coils are connected in an AC bridge circuit the output of which is amplified by an operational amplifier 78. The amplifier output can be used to adjust the torque of the disk motors connected to opposite wheels.

Figure 7:
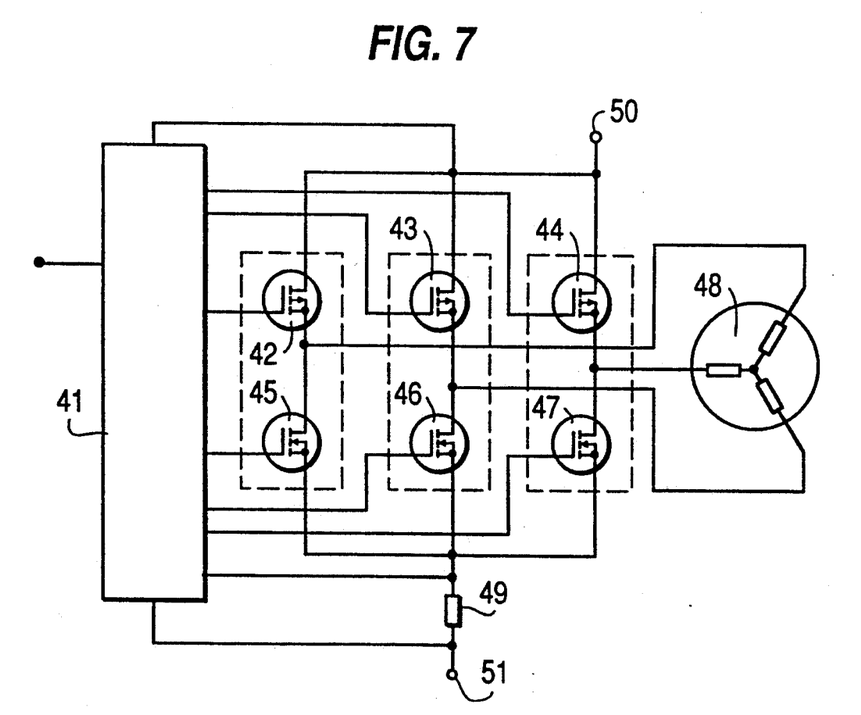
FIG. 7 is a schematic circuit diagram of a motor drive circuit.

FIG. 7 shows an alternative to FIG. 6. The control circuit 41 corresponds to the control circuit 40 of FIG. 6. In lieu of the thyristor circuit 40 of FIG. 6, FIG. 7 comprises a bridge circuit with in each leg two MOSFET transistors 42, 45; 43, 46; and 44, 47. Illustratively, types Si 9954 DY or Si 9950 DY made by Siliconix, USA may be used. Each pair of transistors controls one phase of the brushless three-phase AC motor 48.

Conventional CMOS components can be used in the control circuit. The resistor 49 serves to ascertain the current in the bridge-pairs 42, 45; 43, 46; 44, 47. The supply voltage is connected to the terminals 50, 51.

Figure 8:
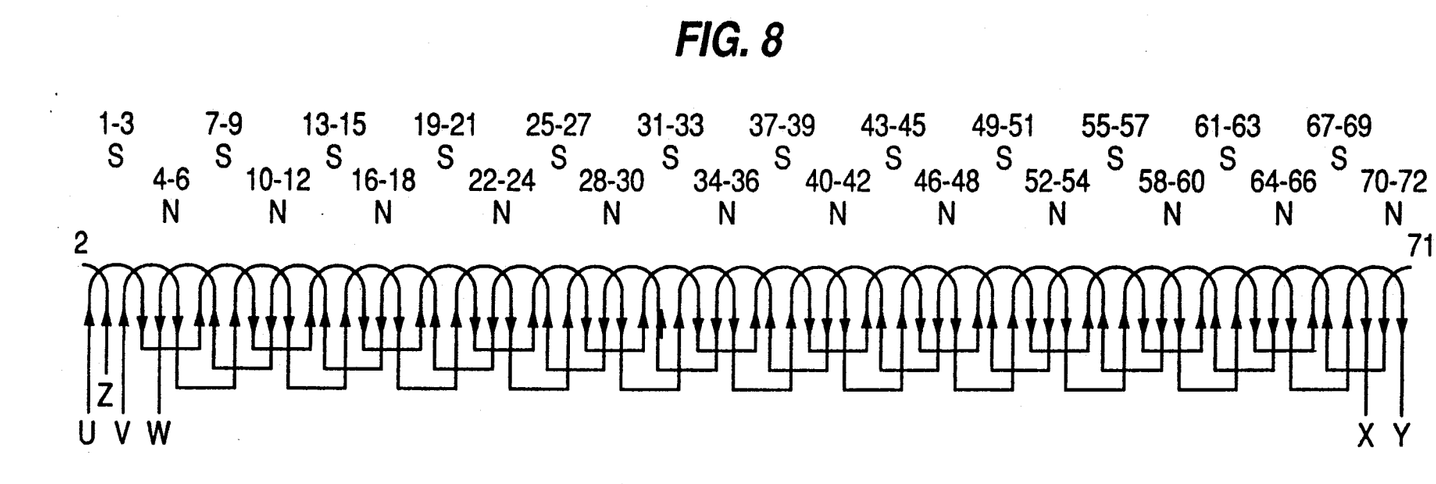
FIG. 8 is a schematic diagram showing the windings of a 24-pole motor.

FIG. 8 shows the winding of a 24-pole motor with terminals U, V, W and X, Y, Z. The number of poles also may be different, for instance being twelve. The connections and the alternating pole sequence of the magnets are shown above the representation of FIG. 8.

By using a switching circuit, the motors may be used as generators when the brakes are applied and the energy generated in this manner may thus be fed back to the battery. Also, the motor(s) may be connected in series or in parallel. Preferably the frequency and amplitude of the three-phase AC fed to the individual motors at the wheels are controlled individually to control according to need, especially when on curves.

What is claimed is:

1. An electrical power plant for a vehicle, particularly an automobile, comprising
    a battery (1);
    at least one 12- or 24-pole three-phase disk-rotor motor (6) with a shaft operatively coupled to a wheel, said motor comprising
        a disk-rotor with conducting strips mounted on the motor shaft, and
        circularly arrayed magnets of alternating polarities on either side of the rotor equipped with iron returns outside the rotor periphery; and
    means for controlling said motor including a power supply having variable amplitude and frequency, said power supply comprising
        a three-phase DC-AC inverter (16) connected to receive DC voltage from said battery and to generate a high-amplitude three phase voltage;
        an AC-DC rectifier (17) and a smoothing circuit (18) connected to the output of said inverter to receive and rectify said three-phase voltage into DC voltage;
        a pulse-width control (19) connected to receive the output of said smoothing circuit and having an output variable in pulse width and pulse repetition rate; and
        circuit means connecting said output of said pulse width control to a three-phase winding of said disk-rotor motor.

2. A power plant according to claim 1 wherein one three-phase disk-rotor motor (6) is provided at two mutually opposite wheels of the vehicle and wherein motor torque and/or frequency is controlled by a steering angle set by a vehicle driver.

3. A power plant according to claim 1 wherein said pulse-width control includes a plurality of thyristors (20-22) in said circuit means connecting said output of said pulse width control to said motor, said thyristors being ignited by magnetically controlled resistors (28-30) while being voltage-isolated, said thyristors being controlled by pulse generators adjustable in frequency.

4. A power plant according to claim 1 wherein the magnets are made of rare earths.

5. A power plant according to claim 1 wherein said motor further comprises wiper contact means for supplying power to said motor, said wiper means being mounted radially adjacent said motor shaft.

* * * * *